(12) United States Patent
Hata et al.

(10) Patent No.: US 9,580,070 B2
(45) Date of Patent: Feb. 28, 2017

(54) HYBRID VEHICLE

(71) Applicant: TOYOTA JIDOSHA KABUSHIKI KAISHA, Toyota-shi, Aichi-ken (JP)

(72) Inventors: Kensei Hata, Susono (JP); Yuji Iwase, Mishima (JP); Yosuke Suzuki, Susono (JP); Koichi Kato, Nagoya (JP); Seitaro Nobuyasu, Susono (JP); Taro Moteki, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/910,102

(22) PCT Filed: Aug. 7, 2014

(86) PCT No.: PCT/IB2014/001478
§ 371 (c)(1),
(2) Date: Feb. 4, 2016

(87) PCT Pub. No.: WO2015/019164
PCT Pub. Date: Feb. 12, 2015

(65) Prior Publication Data
US 2016/0176396 A1 Jun. 23, 2016

(30) Foreign Application Priority Data
Aug. 9, 2013 (JP) .................................. 2013-165751

(51) Int. Cl.
*B60W 20/00* (2016.01)
*B60K 6/48* (2007.10)
(Continued)

(52) U.S. Cl.
CPC ............. *B60W 20/40* (2013.01); *B60K 6/387* (2013.01); *B60K 6/442* (2013.01); *B60K 6/445* (2013.01);
(Continued)

(58) Field of Classification Search
CPC ............. B60W 20/40; B60W 1010/06; B60W 1010/08; B60W 1010/02; B60W 30/20;
(Continued)

(56) References Cited

U.S. PATENT DOCUMENTS 5,788,006 A 8/1998 Yamaguchi
6,244,368 B1 * 6/2001 Ando ....................... B60K 6/48
180/65.25
(Continued)

FOREIGN PATENT DOCUMENTS

JP H08-295140 A 11/1996
JP 2001-113967 A 4/2001
(Continued)

*Primary Examiner* — Michael J Zanelli
(74) *Attorney, Agent, or Firm* — Andrews Kurth Kenyon LLP

(57) ABSTRACT

A hybrid vehicle capable of selecting between a state where a clutch coupling an engine and a motor is engaged and the vehicle travels by drive power of the engine, and a state where the clutch is released and the vehicle travels with the engine stopped, wherein, if there is a request to restart the engine while the engine is rotating after control to release the clutch and stop the engine has been started, then upon the condition that the engine number of revolutions is equal to or greater than a predetermined threshold value, and in a state where the output torque of the motor is limited to a previously established torque or less, control to increase the transmission torque capacity of the clutch is implemented, whereupon the output torque of the motor is increased to a torque that cranks the engine.

4 Claims, 4 Drawing Sheets

(51) Int. Cl.
*B60W 10/02* (2006.01)
*B60W 30/20* (2006.01)
*F16D 48/06* (2006.01)
*F02N 11/08* (2006.01)
*B60K 6/387* (2007.10)
*B60K 6/445* (2007.10)
*B60W 10/06* (2006.01)
*B60W 10/08* (2006.01)
*B60K 6/442* (2007.10)
*F02N 11/04* (2006.01)

(52) U.S. Cl.
CPC ............ *B60W 10/02* (2013.01); *B60W 10/06* (2013.01); *B60W 10/08* (2013.01); *B60W 20/10* (2013.01); *B60W 30/20* (2013.01); *F02N 11/0844* (2013.01); *F16D 48/06* (2013.01); *B60W 2030/206* (2013.01); *B60W 2510/0638* (2013.01); *B60W 2710/083* (2013.01); *B60Y 2200/92* (2013.01); *B60Y 2300/182* (2013.01); *B60Y 2300/42* (2013.01); *B60Y 2300/60* (2013.01); *F02N 11/04* (2013.01); *F02N 2200/022* (2013.01); *F02N 2200/103* (2013.01); *F02N 2300/102* (2013.01); *F02N 2300/104* (2013.01); *F16D 2500/1066* (2013.01); *F16D 2500/3067* (2013.01); *F16D 2500/3069* (2013.01); *F16D 2500/30401* (2013.01); *F16D 2500/50661* (2013.01); *F16D 2500/50858* (2013.01); *F16D 2500/5124* (2013.01); *F16D 2500/5126* (2013.01); *F16D 2500/7041* (2013.01); *F16D 2500/7044* (2013.01); *F16D 2500/70458* (2013.01); *Y02T 10/48* (2013.01); *Y02T 10/6239* (2013.01); *Y02T 10/6286* (2013.01); *Y10S 903/93* (2013.01)

(58) Field of Classification Search
CPC .......... B60W 2510/0638; B60K 6/442; B60K 6/387; B60K 6/445; F16D 48/06; F16D 2500/7044; F16D 2500/1066; F16D 2500/3067; F02N 11/0844; F02N 2300/104; F02N 2300/102; B60Y 2300/182; B60Y 2300/42; B60Y 2300/60; B60Y 2200/92; Y10S 903/93; Y02T 10/6286; Y02T 10/48; Y02T 10/6239
See application file for complete search history.

(56) References Cited

U.S. PATENT DOCUMENTS

| | | | |
|---|---|---|---|
| 6,253,127 B1* | 6/2001 | Itoyama | ................ B60K 6/442 123/179.1 |
| 6,342,027 B1* | 1/2002 | Suzuki | .................... B60K 6/48 477/5 |
| 2002/0123407 A1 | 9/2002 | Hanyu et al. | |
| 2005/0121239 A1 | 6/2005 | Tsuneyoshi et al. | |
| 2006/0037573 A1 | 2/2006 | Iwatsuki et al. | |
| 2015/0344025 A1* | 12/2015 | Park | ........................ B60K 6/48 701/22 |

FOREIGN PATENT DOCUMENTS

| | | |
|---|---|---|
| JP | 2002-262409 A | 9/2002 |
| JP | 2005-162142 A | 6/2005 |
| JP | 2005-220873 A | 8/2005 |
| JP | 2010-076678 A | 4/2010 |
| JP | 2012-030727 A | 2/2012 |
| JP | 2013-018399 A | 1/2013 |
| JP | 2013-086649 A | 5/2013 |
| KR | 1020070091392 A | 9/2007 |

* cited by examiner

| TRAVEL MODE | K0 CLUTCH ENGAGED: O RELEASED: - |
|---|---|
| DISENGAGED EV | — |
| NORMAL EV | O |
| HV MODE | O |

HYBRID VEHICLE

CROSS-REFERENCE TO RELATED APPLICATIONS

This is a national phase application based on the PCT International Patent Application No. PCT/IB2014/001478 filed Aug. 7, 2014, claiming priority to Japanese Patent Application No. 2013-165751 filed Aug. 9, 2013, the entire contents of both of which are incorporated herein by reference.

BACKGROUND OF THE INVENTION

1. Field of the Invention

This invention relates to a hybrid vehicle provided with an engine and a motor or a motor-generator, as drive power sources, and configured to be able to disengage the engine from the drive power transmission system or motor.

2. Description of Related Art

In a hybrid vehicle that is provided with both a motor or motor-generator (below these may be referred to jointly as "motor") and an engine as sources of motive power, various advantages are obtained in that it is possible to halt the engine (perform an idling-stop) when the vehicle is stationary, regeneration of energy can be performed by the motor when decelerating, and the engine can be operated at an operating point of good energy efficiency, and so on. In particular, when the time during which the vehicle travels by the power of the motor becomes longer, the effect of improving the overall fuel consumption of the vehicle is raised. This is because, in the case of motor-powered travel, the engine is stopped and fuel is not consumed. In this case, in order to reduce the loss of motive power due to turning over of the engine, it is desirable for the engine to be disengaged from the motor which is outputting drive power for travel or from a power transmission system which transmits this drive power to the vehicle wheels. If a clutch is provided in order to disengage the engine in this way, it is possible to select an operational mode in which the engine is stopped or the engine is driven, during travel by the power of the motor. A hybrid vehicle provided with a clutch for disengaging the engine in this way is described in Japanese Patent Application Publication No. 08-295140 (JP 08-295140 A).

To give a brief description of this composition, an electric generator is coupled to a first rotating element in a differential mechanism provided with three rotating elements, such as a planetary gear mechanism, and furthermore a second rotating element is taken as an output element and a third rotating element is coupled to braking means. The engine is coupled to the third rotating element via a clutch. Furthermore, a motor is coupled to the second rotating element. Consequently, in the composition described in JP 08-295140 A, since the differential mechanism functions as a decelerating device or an accelerating device due to the third rotating element being fixed by the engine or the braking means, then it is possible to cause the electric generator coupled to the first rotating element to function as a motor and to transmit the torque thereof to the output element. In other words, it is possible to cause the vehicle to travel by motive power outputted from the electric generator and the motor. If a unidirectional clutch which fixes the third rotating element by engaging therewith when a torque is applied in a direction causing reverse rotation of the third rotating element is used as braking means, then the third rotating element can be fixed by the unidirectional clutch, independently of the engine, during motor-powered travel, and since the clutch can be disengaged from the third rotating element, then it is possible to continue to drive the engine or to stop the engine.

Furthermore, Japanese Patent Application Publication No. 2013-18399 (JP 2013-18399 A) describes a control apparatus designed for a hybrid vehicle which couples an engine, a motor and a transmission apparatus by interposing a clutch respectively therebetween. JP 08-295140 A does not describe the concrete control relating to stopping and restarting of the engine, whereas the apparatus disclosed in JP 2013-18399 A is configured so as to stop combustion of the engine by a braking operation during travel, and to raise the number of revolutions of the engine by disengagement of the braking operation. Control for raising the engine number of revolutions is performed by both the motive power of the vehicle wheels and the motive power of the motor-generator.

Moreover, Japanese Patent Application Publication No. 2005-162142 (JP 2005-162142 A) describes a method for starting an engine in a hybrid vehicle, and according to this description, when the engine is started during electric-powered travel using the motor as a source of motive power, the clutch provided in a hybrid transmission apparatus including an engine and a motor is engaged gradually, and the engine is gradually cranked as the torque of this clutch is gradually increased. The torque variation during this starting of the engine is absorbed by slipping of the clutch.

Japanese Patent Application Publication No. 2013-86649 (JP 2013-86649 A) describes an apparatus which is configured so as to stop a supply of fuel to an engine when a hybrid vehicle is decelerating, and to delay decline in the number of revolutions of the engine by controlling the speed ratio of a belt-type step-less transmission mechanism which is coupled to the output side of the engine, to a low speed ratio. This control of the reduction in the decline of the engine number of revolutions is control for achieving a restart of the engine by raising the possibility or frequency of the engine rotating, when a request for restarting of the engine is established.

SUMMARY OF THE INVENTION

As described in JP 08-295140 A, JP 2013-18399 A, JP 2005-162142 A and JP 2013-86649 A, in a hybrid vehicle provided with a clutch capable of disengaging the engine from the power transmission system or motor, it is possible to disengage the clutch and stop the engine, when travelling by the power of the motor. When the engine is restarted, generally, since the motor is provided as a drive power source, then the engine is cranked by the motor, by engaging the clutch and transmitting the torque of the motor to the engine. In this case, if the vehicle is travelling, then when the clutch is engaged, the inertial torque which arises as the engine number of revolutions is raised acts as a torque that cancels out the drive torque, and hence there is a possibility that shocks or vibrations, or the like, may occur. JP 08-295140 A does not disclose a technical feature relating to the restarting of the engine, and although JP 2013-18399 A describes using both the motive power of the vehicle wheels and the motive power of the motor-generator as cranking torque for the engine, the fact that the engine is cranked by engaging the clutch while causing a torque of this kind to act leads to increased variation in the torque and the possibility of worsening of the shocks and vibrations.

In respect of this, in the apparatus described in JP 2005-162142 A, sudden changes in torque are suppressed by slipping of the clutch. The clutch provided on the output side of the engine is often a frictional clutch, and it is normal for slipping to occur and for the variation in torque to be diminished by this slipping, but if it is supposed that further slipping of this kind is caused to occur, then the durability of the clutch will steadily decline, and there is a possibility of delay in the cranking of the engine. If the speed ratio is raised and the decline in the engine number of revolutions is delayed, as described in JP 2013-86649 A, then loss of motive power occurs as the engine rotates, and furthermore, an unintentional braking force occurs, and there is also a possibility that the engine number of revolutions at the time of restarting the engine may be excessively high.

This invention provides a hybrid vehicle which is capable of restarting an engine, without causing worsening of shocks and vibrations, or the restarting response of the engine, and so on.

An aspect of this invention relates to a hybrid vehicle. The hybrid vehicle includes an engine, a motor, a clutch and an electronic control unit. The engine is a drive power source. The motor is a drive power source. The clutch is configured to connect the engine and the motor to each other by engaging. The clutch is configured to disconnect the engine and the motor from each other by disengaging. The electronic control unit is configured to: (a) select a mode in which the clutch is engaged and the hybrid vehicle travels by drive power from the engine, or a mode in which the clutch is disengaged and the hybrid vehicle travels with the engine stopped, (b) execute a control to limit an output torque of the motor to a predetermined torque or less and to increase a transmission torque capacity of the clutch, (i) when there is a request to restart the engine and the engine rotates, after a control to disengage the clutch and stop the engine has been started, and (ii) when the speed of the engine is equal to or greater than a predetermined threshold value, and (c) subsequently increase the output torque of the motor to a torque that cranks the engine.

In the hybrid vehicle, the limited output torque of the motor may include a torque that is obtained by setting a current of the motor to zero.

In the hybrid vehicle, the threshold value may include a rotation speed equal to or greater than a resonant rotation speed of a power transmission system that transmits an output torque of the engine to drive wheels of the hybrid vehicle.

The hybrid vehicle may include a power split mechanism. The power split mechanism may include a differential mechanism that performs a differential action by a first rotating element, a second rotating element and a third rotating element. The engine is connected to the first rotating element via the clutch. The motor is connected to the second rotating element. The third rotating element is an output element. Another motor is connected to the third rotating element.

In this invention, if there is a request to restart the engine before the rotation of the engine has stopped, after starting control for stopping the engine, then control corresponding to the number of revolutions of the engine is implemented. More specifically, if the engine number of revolutions is equal to or higher than a previously established threshold value, then the output torque of the motor for cranking the engine is limited to no more than a previously established torque, and in this state, control for increasing the torque of the clutch is implemented. As a result of this, the change in torque due to coupling of the stopped engine, by the clutch, is alleviated by the fact that the output torque of the motor is small, and therefore incongruities, such as shocks, are prevented or suppressed. After this, the torque of the motor is increased to an extent capable of cranking the engine. Consequently, the engine is cranked in accordance with the subsequent request to restart, without waiting for the rotation of the engine to stop under the preceding control for stopping, and therefore the time until reaching autonomous rotation can be made as short as possible, and the restarting response is improved. Furthermore, since the change in the torque in this case is eased, then incongruities such as shocks or vibrations are prevented or suppressed.

Moreover, by coupling to the engine via a clutch and limiting the output torque of the motor cranking the engine to zero, it is possible to diminish the change in the torque due to engagement of the clutch, by change in the number of revolutions of the motor, in other words, by inertial force, and it is simultaneously possible to cause the inertial force of the motor to function as a cranking torque for the engine.

This control for commencing control of restarting of the engine by increasing the transmission torque capacity of the clutch in a state where the output torque of the motor is limited, is restricted to cases where the engine number of revolutions when restarting the engine is equal to or greater than the number of resonant revolutions of the power transmission system, and therefore worsening of the so-called "NV characteristics", such as vibrations and noise, is prevented or suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

This invention is an apparatus which controls a hybrid vehicle provided with an engine, and a motor or a motor-generator (hereinafter, a motor and motor-generator are referred to jointly as a "motor") as drive power sources. In vehicles of this kind, in addition to travel powered by the engine and travel powered by the engine and the motor, it is also possible to perform travel using only the motor, or travel in which energy is regenerated by the motor, and so on, and it is also possible to adopt a drive mode where the engine is stopped and then restarted again, during motor-powered travel. In so-called electric vehicle (EV) travel where the vehicle travels by using the motor as a drive power source, it is desirable to suppress loss of motive power due to turning over of the engine, and furthermore, it is desirable to provide a plurality of motors and to stop the engine in the event of EV travel where the vehicle is travelling by the power of any of the motors, as well as reducing the loss of motive power due to turning over of a motor which is not outputting motive power. Due to requirements of this kind, there are cases where a clutch is provided to disengage the engine from the power transmission system which transmits motive power to the drive wheels, or the motor which is cranking the engine, and this invention is applied to a control apparatus which is designed for a hybrid vehicle provided with a clutch of this type.

Figures 3, 4:
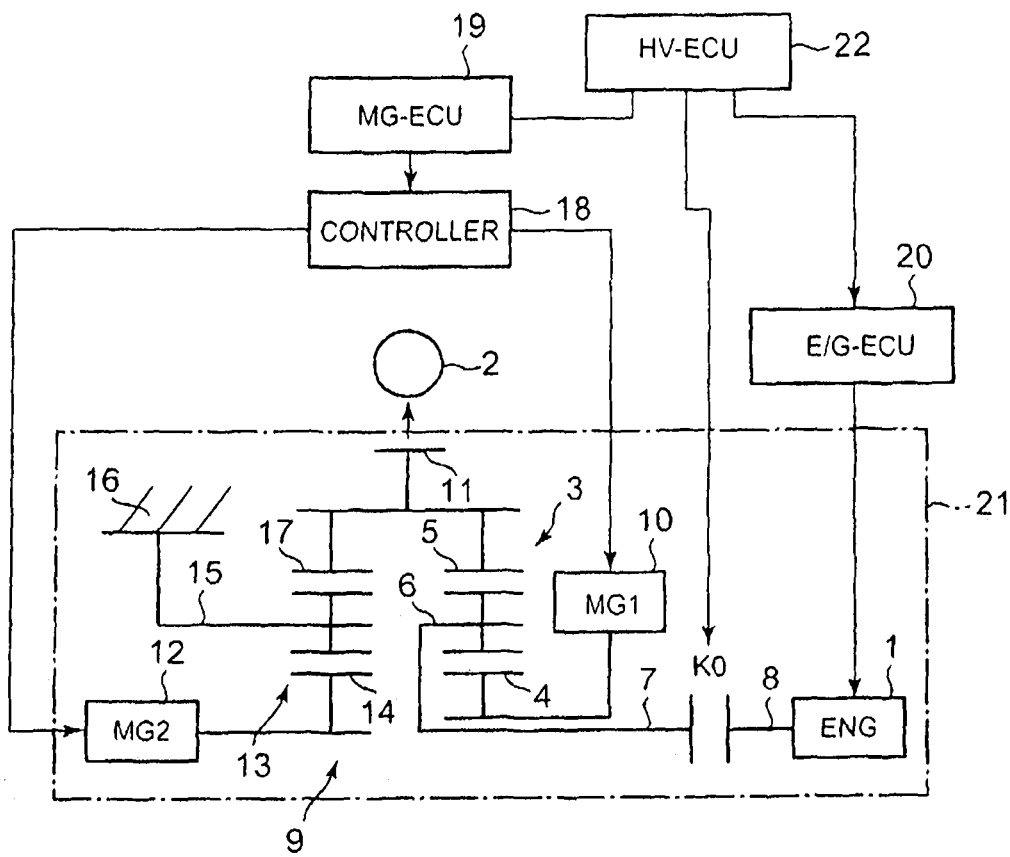
FIG. 3 is a skeleton diagram showing one example of a gear train of a hybrid vehicle to which this invention can be applied.
FIG. 4 is a chart showing an overview of travel modes and the engaged and released state of the clutch.

FIG. 3 shows a schematic view of one example of a gear train in a hybrid vehicle provided with the clutch described above. The example shown here is an example in which a portion of the motive power outputted by an engine (ENG) 1 is transmitted to drive wheels 2 via mechanical means, while the other portion of the motive power outputted by the engine 1 is converted temporarily into electric power, and is subsequently converted back into mechanical motive power and transmitted to the drive wheels 2. A power split mechanism 3 for dividing the motive power outputted from the engine 1 in this way is also provided. This power split mechanism 3 has a similar configuration to the power split mechanism in a conventionally available hybrid drive apparatus of a two-motor type, and in the example shown in FIG. 3, is composed by a differential mechanism which generates a differential action by three rotating elements, for example, a single pinion-type planetary gear mechanism. The single pinion-type planetary gear mechanism is composed by a sun gear 4, a ring gear 5 disposed concentrically with respect to the sun gear 4, and a carrier 6 which holds a pinion gear that meshes with the sun gear 4 and the ring gear 5, so as to be independently or communally rotatable.

The carrier 6 is an input element, and an input shaft 7 is coupled to the carrier 6. Furthermore, a clutch K0 is provided between the input shaft 7 and an output shaft (crankshaft) 8 of the engine 1. The clutch K0 couples the engine 1 to a power transmission system 9, such as the power split mechanism 3, or the like, or disengages the engine 1 from the power transmission system 9, and is composed by a frictional clutch of which the transmission torque capacity changes continuously from a "zero" state, which is a fully released state, to a fully engaged state in which there is no slippage. The frictional clutch may be either a conventionally available dry or wet clutch, and may be a single-plate or multiple-plate clutch. Moreover, the actuator which changes the engaged and disengaged state of the clutch may be a hydraulic actuator or an electromagnetic actuator, or the like. For example, in the case of a dry single-plate clutch which is used in a conventional vehicle, an engaged state is maintained by a so-called "return mechanism", such as a diaphragm spring, by setting the actuator to a non-operational state. Consequently, the transmission torque capacity of the clutch K0 changes in accordance with the amount of operation of the actuator for engaging and releasing the clutch K0, and there is a correlation between these two factors. More specifically, there is a substantially proportional relationship between the hydraulic pressure, or the current value, or the stroke, of the actuator, and the transmission torque capacity, and therefore the transmission torque capacity is previously determined as a value which corresponds to the amount of operation, such as the stroke amount or the hydraulic pressure, or the actuator, and can be prepared in a map format, or the like. If the coefficient of friction changes over time, then the relationship between the transmission torque capacity and the amount of operation varies.

Furthermore, the sun gear 4 is a reactive element and a first motor-generator (MG1) 10 is coupled to this sun gear 4. In short, the first motor-generator 10 is a motor having an electricity generating function, which is composed by a permanent magnet synchronous electric motor. Moreover, the ring gear 5 is an output element, and an output gear 11 which is an output member is integrated with this ring gear 5, in such a manner that drive power is output from the output gear 11 to the drive wheels 2. The mechanism for transmitting drive power from the output gear 11 to the drive wheels 2 is provided with a differential gear and a drive shaft, and is similar to that of a conventional vehicle and therefore details thereof are omitted here.

The first motor-generator 10 is arranged on the same axial line as the engine 1 and the power split mechanism 3, and a second motor-generator 12 which corresponds to the other motor of this invention is arranged on an extension of this axial line. This second motor-generator 12 generates drive power for travel, and also performs regeneration of energy, and similarly to the first motor-generator 10 described above, is composed by a permanent magnet synchronous electric motor, or the like. The second motor-generator 12 and the output gear 11 are coupled via a speed reducing mechanism 13. In the example shown in FIG. 3, this speed reducing mechanism 13 is composed by a single pinion planetary gear mechanism, and in addition to the second motor-generator 12 being coupled to the sun gear 14, the carrier 15 is coupled and fixed to a fixed section 16, such as a housing, and furthermore, the ring gear 17 is integrated with the output gear 11.

The motor-generators 10 and 12 described above are connected electrically to a controller 18 which includes an accumulator apparatus and an inverter, and the like. A motor-generator electronic control unit (MG-ECU) 19 for controlling the controller 18 is provided. This MG-ECU 19 is composed principally by a microcomputer, which performs computations on the basis of input data, stored data, command signals, or the like, and is configured so as to output the results of these computations to the controller 18 as a control command signal. The motor-generators 10, 12 function as a motor or electric generator in accordance with a control signal from the controller 18, and are configured in such a manner that the torque in each case is controlled respectively.

Furthermore, the engine 1 described above is composed in such a manner that the output, starting and stopping thereof are controlled electrically. For instance, in the case of a gasoline engine, the engine is configured in such a manner that the throttle opening, fuel supply amount, the halting of the supply of fuel, the implementation and stopping of ignition, the ignition timing, and the like, are controlled electrically. An engine electronic control unit (E/G-ECU) 20 for performing this control is provided. This E/G-ECU 20 is composed principally by a microcomputer, which performs computations on the basis of the input data and the command signal, and is configured to output the results of these computations to the engine 1 as a control signal, and to implement the various types of control described above.

The engine 1, and the motor-generators 10, 12, the clutch K0 and the power split mechanism 3, and the like, constitute a drive power source 21, and a hybrid electronic control unit (HV-ECU) 22 for controlling the drive power source 21 is provided. The HV-ECU 22 is composed principally by a microcomputer, and is configured so as to implement the various controls described below by outputting command signals to the MG-ECU 19 and the E/G-ECU 20 described above.

In the hybrid drive apparatus shown in FIG. 3, it is possible to set a hybrid (HV) mode in which the vehicle travels by the power of the engine 1, and an EV mode in which the vehicle travels by electric power, and furthermore, in the EV mode, it is possible to set a disengaged EV mode in which the engine 1 is disengaged from the power transmission system 9, and a normal mode in which the engine 1 is coupled to the power transmission system 9. FIG. 4 shows an overview of the engaged and released states of the clutch K0 when these respective modes are set. More specifically, in the disengaged EV mode, the clutch K0 is released, whereas in the normal EV mode and the HV mode, the clutch K0 is engaged. These travel modes are selected in accordance with the state of travel of the vehicle, namely, the drive request amount, such as the accelerator depression amount, and/or the vehicle speed, the state of charge (SOC) of the accumulator apparatus, and the like. For example, if the vehicle is travelling at a certain speed, and the accelerator depression amount has been increased by a certain amount so as to maintain this vehicle speed, then the HV mode is set. On the other hand, if the SOC is sufficiently large and the accelerator depression amount is relatively small, for instance, then the normal EV mode is set. Moreover, if, for example, the EV mode is selected by manual operation by the driver, or if travel is possible by electric power only and it is necessary to suppress the loss of motive power caused by turning over of the first motor-generator 10, or the like, then the disengaged EV mode is selected.

Figure 5:
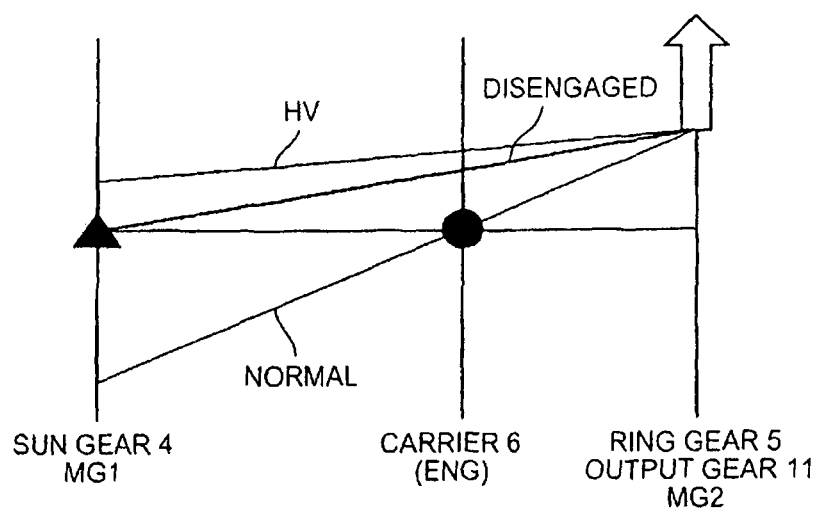
FIG. 5 is an alignment chart for describing the operational state in each travel mode.

Here, to give a brief description of the operational state of the hybrid drive apparatus in each of the travel modes, FIG. 5 is an alignment chart relating to the power split mechanism 3 described above, and this alignment chart indicates the sun gear 4, the carrier 6, and the ring gear 5 by vertical lines, the intervals between these lines corresponding to the gear ratios of the planetary gear mechanism which constitutes the power split mechanism 3, the upward/downward direction of the vertical lines indicating the direction of rotation, and the position in the upward/downward direction indicating the number of revolutions. The line labelled "disengaged" in FIG. 5 indicates an operational state in the disengaged EV mode, and in this travel mode, the second motor-generator 12 is caused to function as a motor, the vehicle travels by the motive power from this motor, and the engine 1 is disengaged from the power transmission system 9 by releasing the clutch K0 and is stopped, in addition to which the first motor-generator 10 is also stopped. Therefore, the rotation of the sun gear 4 stops, and in response to this, the ring gear 5 rotates forwards together with the output gear 11, and the carrier 6 rotates forwards at the number of revolutions that is reduced in accordance with the gear ratio of the planetary gear mechanism with respect to the number of revolutions of the ring gear 5.

Furthermore, the line labelled "normal" in FIG. 5 indicates an operational state in normal EV mode, and in this travel mode, the vehicle travels by the motive power of the second motor-generator 12, and since the engine 1 has been stopped, the ring gear 5 rotates forwards with the carrier 6 in a fixed state, and the sun gear 4 rotates backwards. In this case, the first motor-generator 10 can also be made to function as an electric generator. Moreover, the line labelled "HV" in FIG. 5 indicates a state of travel in HV mode, and since the engine 1 outputs drive power in a state where the clutch K0 has been engaged, then a torque acts on the carrier 6 in a direction causing same to rotate forwards. In this state, a torque in the reverse direction of rotation acts on the sun gear 4, by causing the first motor-generator 10 to function as an electric generator. As a result of this, a torque arises in the ring gear 5 in a direction causing same to rotate forwards. Furthermore, in this case, the electric power generated by the first motor-generator 10 is supplied to the second motor-generator 12, the second motor-generator 12 functions as a motor, and this drive power is transmitted to the output gear 11. Consequently, in the HV mode, a portion of the motive power outputted by the engine 1 is transmitted to the output gear 11 via the power split mechanism 3, in addition to which the remaining motive power is converted into electric power by the first motor-generator 10 and transmitted to the second motor-generator 12, and is then converted back into mechanical motive power by the second motor-generator 12 and transmitted to the output gear 11. In any of the travel modes, if there is no need to actively output drive power, for instance, when decelerating, then either of the motor-generators 10 and 12 functions as an electric generator and regeneration of energy is performed.

In the hybrid vehicle described above, the travel mode is selected and set in such a manner that the drive request is satisfied and the energy efficiency is good. Accordingly, the engaged and disengaged state of the clutch K0 is switched in accordance with change in the state of travel, such as the accelerator depression amount, or the vehicle speed, operations of the brakes, and the like, and control of stopping and restarting the engine 1, and the like, is implemented. To give one example of switching of the travel mode, for example, if the accelerator pedal is depressed by a certain amount in a so-called medium/high-speed state, then the HV mode described above is selected, the clutch K0 is engaged, the engine 1 is driven, and the vehicle travels due to the output of the engine 1, and if the accelerator pedal is returned from this state, to assume a so-called steady speed travel under light load, then the vehicle is switched to the disengaged EV mode. This switching of the travel mode is carried out principally on the basis of change in the accelerator depression amount, and therefore if the accelerator pedal has been returned, and is then immediately depressed again, then the HV mode is selected so as to satisfy the drive request. In other words, immediately after implementing control to release the clutch K0 and stop the engine 1, control is started to engage the clutch K0 and restart the engine 1. The control apparatus relating to this invention is composed in such a manner that this restart control performed immediately after the stop control of the engine 1 is implemented in accordance with the engine number of revolutions.

Figure 1:
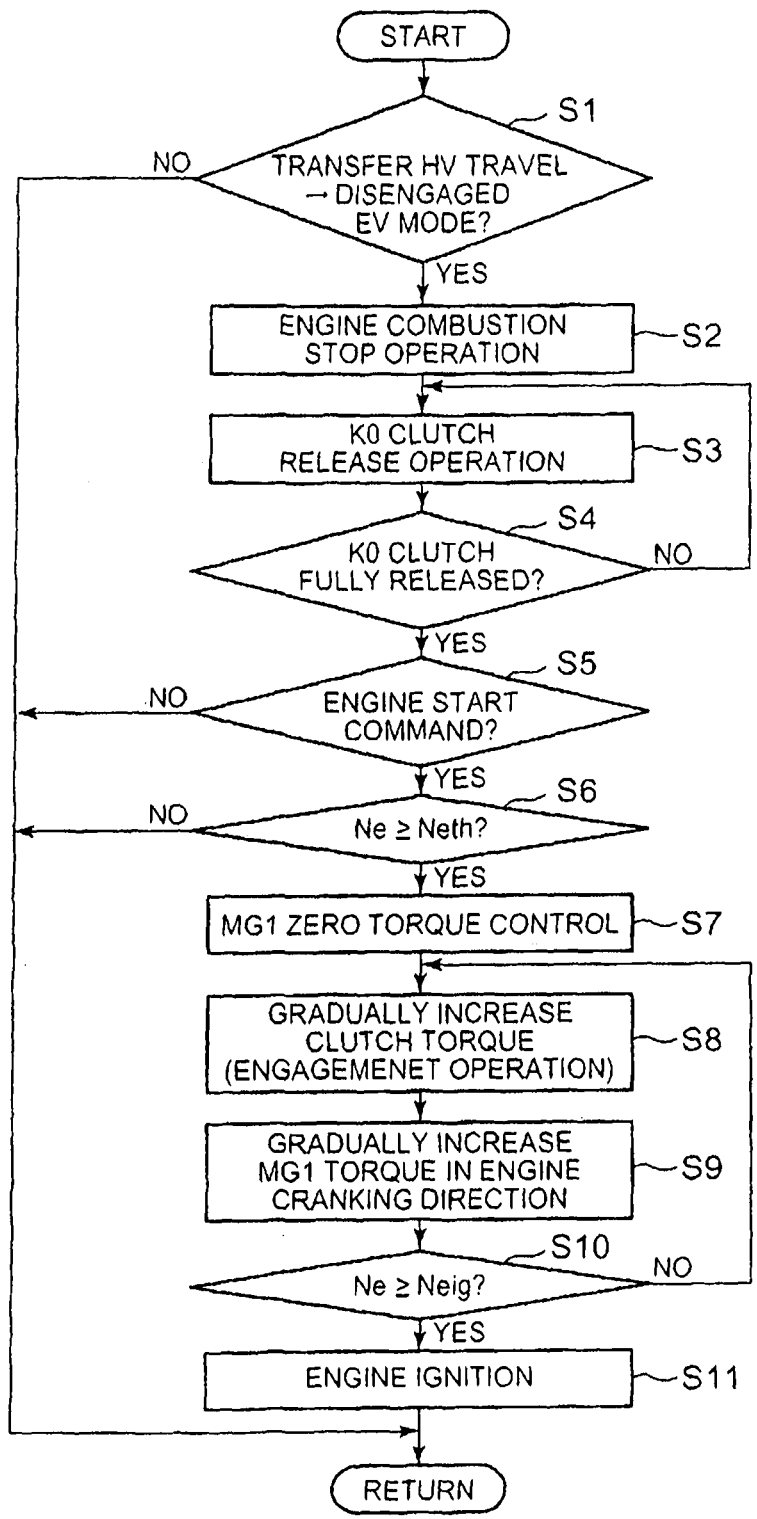
FIG. 1 is a flowchart for describing one example of control implemented by the control apparatus relating to this invention.

One example of this control is shown by a flowchart in FIG. 1. The routine shown in FIG. 1 is implemented repeatedly at previously established short time intervals while the hybrid vehicle is travelling, and firstly, it is determined whether or not a decision for transfer from the HV mode to the disengaged EV mode has been established (step S1). If a negative determination is made in step S1, then the routine returns without implementing any particular control. On the other hand, if an affirmative determination is made at step S1, then control for setting the disengaged EV mode is implemented. In other words, the HV mode is a travel mode in which the vehicle travels by the drive power of the engine 1 and the engine number of revolutions is controlled by the first motor-generator 10, whereas the disengaged EV mode is a travel mode in which the engine 1 is disengaged from the power transmission system 9 and stopped, and the vehicle travels by the motive power of the second motor-generator 12, and therefore control for releasing the clutch K0 and control for stopping the engine 1 are implemented.

In the example shown in FIG. 1, firstly, an engine combustion stopping operation is implemented (step S2), and then a clutch K0 release operation is implemented (step S3). The combustion stopping operation of the engine 1 is an operation of stopping the supply of fuel to the engine 1, and in the case of a gasoline engine, also includes stopping ignition. The throttle opening is desirably set to be fully open or close to fully open, in order to reduce the braking force produced by the engine 1. Furthermore, the release operation of the clutch K0 is continued until a fully released state is detected, in other words, until an affirmative determination is made in step S4. It can be determined that the clutch K0 has been fully released on the basis of the stroke or hydraulic pressure of the actuator (not illustrated) which releases the clutch K0, or the elapsed time from the start of the release operation.

If an affirmative determination is made at step S4 due to the clutch K0 having been released fully, then it is determined whether or not there is a command to start the engine 1 (step S5). The engine 1 serves as a source of motive power for the whole hybrid vehicle, at the same time as being a drive power source for travel and acceleration, and therefore if there is an acceleration request because, for instance, the accelerator pedal has been depressed, or if the SOC of the accumulator apparatus (not illustrated) has declined and there is a need for recharging, then a command to start the engine 1 is issued. If a negative determination is made at step S5 because a control command signal for starting the engine 1 has not been issued, then the routine returns without any particular control being implemented. Consequently, in this case, the engine combustion stopping operation implemented by step S2 described above is continued. On the other hand, if an affirmative determination is made at step S5 because there is an engine start command, then it is determined whether or not the engine number of revolutions Ne is equal to or greater than a previously established threshold value Neth (step S6).

The routine shown in FIG. 1 is implemented repeatedly at previously established short time intervals, and since an operation for stopping combustion of the engine 1 is performed but no particular operation for halting rotation thereof is performed in step S2 described above, there may be cases where the engine 1 is continuing to rotate despite the fact that the combustion of the engine 1 has been stopped, if an engine start request is established within a short time period after implementing the control in step S2. In step S6, the engine number of revolutions Ne is compared with a threshold value Neth in a state such as this. This step S6 is a step for determining whether or not shocks and vibrations, and the like, will become worse if the subsequent control is implemented, and therefore the threshold value Neth described above which forms the reference basis for this determination is set to the number of revolutions equal to or greater than the number of resonant revolutions of the power transmission system 9 which leads from the engine 1 to the drive wheels 2. If the threshold value Neth is a value significantly greater than the number of resonant revolutions, then there is less chance of implementing the control from step S7 onwards described below, and if, conversely, the threshold value Neth matches the number of resonant revolutions, which has been determined experimentally or by computation, there is a possibility of increased vibration or noise in the event that the number of resonant revolutions varies with the state of travel of the hybrid vehicle or due to change over time in the power transmission system 9. Consequently, these situations are taken into account in the design stage when determining the threshold value Neth.

If the engine number of revolutions Ne is less than the threshold value Neth and a negative determination is made at step S6, then the routine returns and the routine shown in FIG. 1 is halted temporarily. In this case, since a start command of the engine 1 has already been issued, then normal control for starting the engine 1 is implemented. To describe one example of this, in the hybrid vehicle provided with drive power sources having a composition shown in FIG. 3 described above, the first motor-generator 10 functions as a motor and cranks the engine 1, while drive power for travel is generated by the second motor-generator 12. Consequently, the transmission torque capacity of the clutch K0 is gradually increased, and in accordance with this, the output torque of the first motor-generator 10 is raised. The direction of the torque which is outputted by the first motor-generator 10 is the same as the direction of rotation of the engine 1 and is the upward direction in the alignment chart in FIG. 5. In this way, the torque of the first motor-generator 10 is transmitted to the engine 1 via the clutch K0, and supply of fuel and ignition are performed in a state where the engine number of revolutions Ne has reached the number of revolutions for ignition, whereby the engine 1 is started.

On the other hand, if the engine number of revolutions Ne is equal to or greater than the threshold value Neth and an affirmative determination is made in step S6, then different control is implemented compared to the normal engine start control described above. Firstly, the torque of the first motor-generator 10, which is a motor for cranking the engine 1, is controlled to "0" (step S7). As described with reference to the alignment chart in FIG. 5, the first motor-generator 10 functions so as to output a so-called reactive force in response to the output of the engine 1, and therefore, when the output torque of the first motor-generator 10 is smaller than the torque received by same in the case where the engine 1 outputs torque, then the first motor-generator 10 is caused to rotate by the engine 1. In this case, the inertial torque caused by the rotation of the first motor-generator 10, and the torque output by the first motor-generator 10, act as reactive torque with respect to the engine 1. This reactive torque acts as a cranking torque for the engine 1, in the case of start control for the engine 1. Consequently, in step S7, apart from setting the current of the first motor-generator 10 to "0" and thereby setting the output torque fully to "0", the output torque of the first motor-generator 10 may also be limited to no more than a torque previously established in the design stage, for instance, a torque whereby a slight current passes through the first motor-generator 10.

In a state where the output torque of the first motor-generator 10 is limited as described above, the torque (transmission torque capacity) of the clutch K0 is increased gradually from the "0" value of the released state (step S8). This control is control for preventing or suppressing sudden charges in the torques acting on the engine 1 and the power transmission system 9, and/or shocks caused by same, and so on, and is implemented by changing the hydraulic pressure according to a previously established gradient, if the clutch K0 is a hydraulic pressure clutch.

Thereupon, the output torque of the first motor-generator 10 is gradually increased in a direction which cranks the engine 1 (step S9). The control for increasing the output torque of the first motor-generator 10 may be carried out simultaneously with control for increasing the transmission torque capacity of the clutch K0, or may be started at a point where the effective torque of the clutch K0 has exceeded "0" and has started to increase. In this case, the transmission torque capacity of the clutch K0 may be estimated on the basis of the current value of the first motor-generator 10, and the output torque of the first motor-generator 10 may be controlled in such a manner that this estimated value changes according to a gradient (or rate of change) established in the design stage.

By gradually increasing the transmission torque capacity of the clutch K0 and the output torque of the first motor-generator 10 as described above, the engine 1 is cranked and the number of revolutions Ne is increased gradually. It is determined whether or not the engine number of revolutions Ne which has been increased in this way is equal to or greater than the ignition number of revolutions Neig (step S10). The ignition number of revolutions Neig is the number of revolutions set in the design stage as the number of revolutions at which the engine 1 starts steady self-sustaining revolution due to ignition of fuel. Therefore, the ignition number of revolutions Neig may be a fixed value or may be the number of revolutions that is set in accordance with the capacity, number of cylinders, or temperature, etc., of the engine 1.

If a negative determination is made at step S10 due to the engine number of revolutions Ne not having reached the ignition number of revolutions Neig, then the routine returns to step S8 described above, and control for increasing the transmission torque capacity of the clutch K0 and control in step S9 for increasing the output torque of the first motor-generator 10 are continued. As opposed to this, if an affirmative determination is made in step S10 due to the engine number of revolutions Ne being equal to or higher than the ignition number of revolutions Neig, then control for igniting the air mixture inside the engine 1 is implemented (step S11), and the routine then returns. At the same time as this ignition control, or after same, engagement termination control for setting the clutch K0 to a fully engaged state is implemented.

Figure 2:
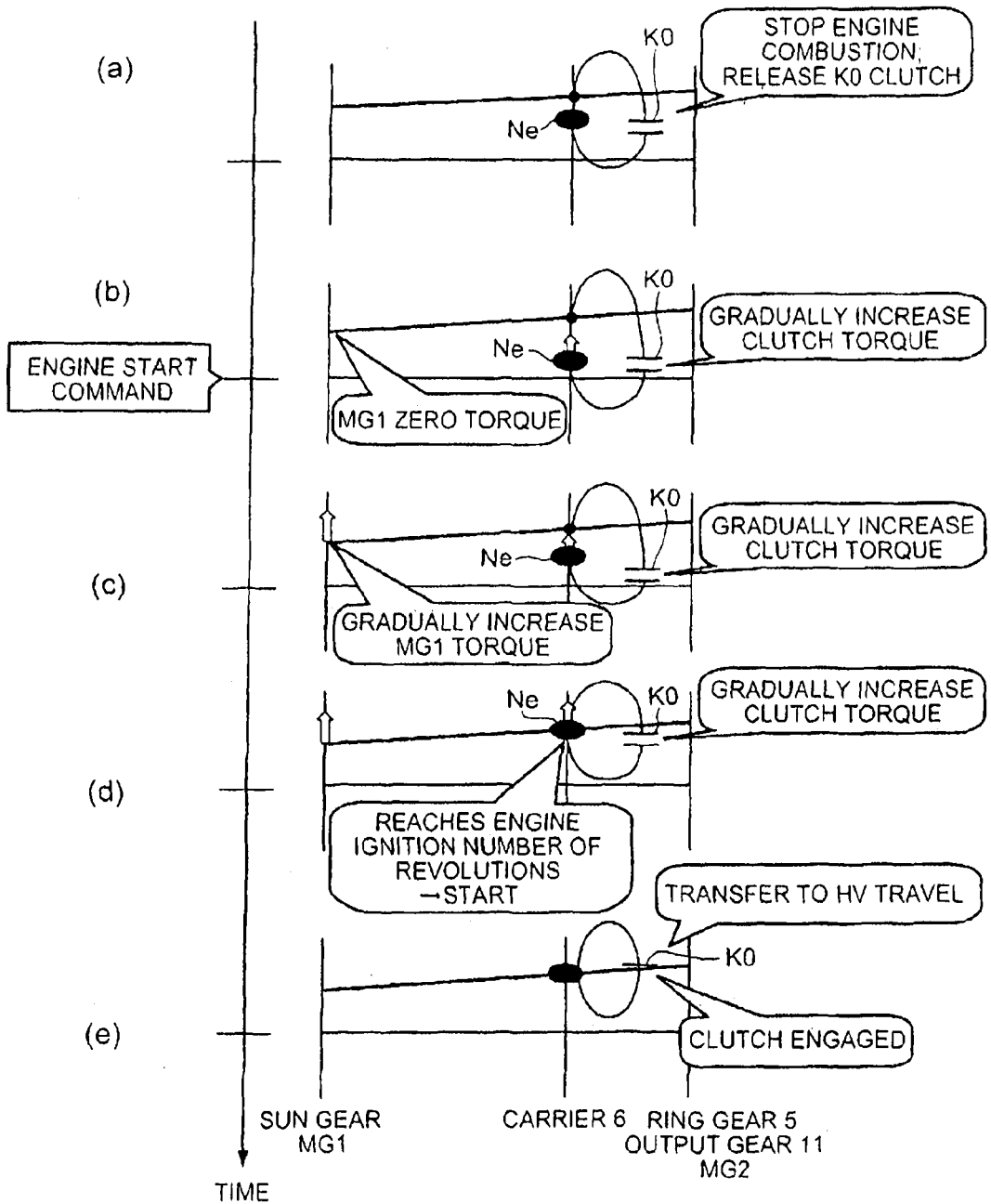
FIG. 2 is an alignment chart relating to a planetary gear mechanism composing a power split mechanism, in order to describe change in the engine number of revolutions, the torque of the first motor-generator, and the like, when the control shown in FIG. 1 is carried out.

Change in the engine number of revolutions Ne, and in the torque of the first motor-generator 10, when the control illustrated in FIG. 1 described above is carried out, is as indicated below when described in terms of the alignment chart relating to the planetary gear mechanism composing the power split mechanism 3. FIG. 2A shows a state immediately after implementing control for stopping combustion in the engine 1 and releasing the clutch K0, in order to transfer from the HV mode to the disengaged EV mode. In the EV mode, since the vehicle travels by the motive power of the second motor-generator 12, then the ring gear 5, which is an output element to which the second motor-generator 12 is coupled, and the output gear 11 which is integrated with the ring gear 5, maintain the existing number of revolutions. Furthermore, the carrier 6 is disengaged from the engine 1, due to the clutch K0 being released, and therefore the existing number of revolutions is principally maintained by the inertial force. Similarly, the sun gear 4, which is a reactive element, and the first motor-generator 10 which is coupled to the sun gear 4, maintain the existing number of revolutions principally by inertial force. As opposed to this, combustion in the engine 1 is stopped when the clutch K0 is released and the engine is disengaged from the carrier 6, and therefore the number of revolutions Ne of the engine becomes smaller than the number of revolutions of the carrier 6.

When a command for starting the engine 1 is issued in this state, then as shown in FIG. 2B, control is implemented to limit the output torque of the first motor-generator 10 to a prescribed value, such as "0", or lower. Consequently, the transmission torque capacity of the clutch K0 is increased gradually. As a result of this, the inertial force of the first motor-generator 10, the sun gear 4 or the carrier 6 is transmitted to the engine 1 via the clutch K0, and the engine number of revolutions Ne is raised or decline in the engine number of revolutions Ne is suppressed. Furthermore, if the torque applied to the sun gear 4 becomes greater due to the increase in the transmission torque capacity of the clutch K0, then the number of revolutions of the first motor-generator 10 is reduced due to the torque or current thereof being limited. Therefore, the variation in torque is absorbed by rotation of the first motor-generator 10 and the sun gear 4, change in the torque in the power transmission system 9 and change in the drive power is diminished, and shocks or vibrations are prevented or reduced.

After the transmission torque capacity of the clutch K0 has started to be increased gradually in this way, then as shown in FIG. 2C, the output torque of the first motor-generator 10 is gradually raised. Therefore, the torque for cranking the engine 1 gradually increases, and the engine number of revolutions Ne is raised. If the engine number of revolutions Ne is raised in this way and reaches the ignition number of revolutions described above (FIG. 2D), then the air mixture in the engine 1 is ignited and the engine 1 starts self-sustaining revolution. As shown in FIG. 2E, the clutch K0 is engaged fully, and the engine number of revolutions Ne is controlled by the first motor-generator 10 so as to become the number of revolutions that permits good fuel efficiency. In other words, the vehicle transfers to the HV mode.

Consequently, in the control apparatus relating to this invention, when the engine 1 is started, provided that the engine number of revolutions Ne is equal to or greater than the threshold value Neth, control for starting the engine is commenced immediately, without waiting for the rotation of the engine 1 to stop. Therefore, the starting response when restarting in a state where the engine 1 is rotating, for instance, when the vehicle is returned to the HV mode immediately after starting control to switch from the HV mode to the disengaged EV mode, is improved over the related art.

This invention is not limited to the specific examples described above, and a clutch may be disposed between the engine and a motor which cranks the engine, and consequently, may also be provided between the sun gear 4 in the power split mechanism 3 shown in FIG. 3, for example, and the first motor-generator 10. Furthermore, desirably, the hybrid vehicle in this invention is a vehicle which is configured in such a manner that the drive power of the engine is distributed to the side of the first motor-generator and the output side, but the invention is not limited to this, and the hybrid vehicle may also be a hybrid vehicle having a configuration in which the engine, the first motor-generator and the second motor-generator are arranged mutually in series with clutches being disposed respectively therebetween.

What is claimed is:
1. A hybrid vehicle comprising:
an engine that is a drive power source;
a motor that is a drive power source;
a clutch configured to connect the engine and the motor to each other by engaging, the clutch configured to disconnect the engine and the motor from each other by disengaging; and
an electronic control unit configured to:
(a) select a mode in which the clutch is engaged and the hybrid vehicle travels by drive power from the engine, or a mode in which the clutch is disengaged and the hybrid vehicle travels with the engine stopped,
(b) execute a control to limit an output torque of the motor to a predetermined torque or less and to increase a transmission torque capacity of the clutch, (i) when there is a request to restart the engine and the engine rotates, after a control to disengage the clutch and stop the engine has been started, and (ii) when a speed of the engine is equal to or greater than a predetermined threshold value, and (c) subsequently increase the output torque of the motor to a torque that cranks the engine.

2. The hybrid vehicle according to claim 1, wherein the limited output torque of the motor includes a torque that is obtained by setting a current of the motor to zero.

3. The hybrid vehicle according to claim 1, wherein the threshold value includes a rotation speed equal to or greater than a resonant rotation speed of a power transmission system that transmits an output torque of the engine to drive wheels of the hybrid vehicle.

4. The hybrid vehicle according to claim 1, further comprising:
    a power split mechanism including a differential mechanism that performs a differential action by a first rotating element, a second rotating element and a third rotating element,
    wherein the engine is connected to the first rotating element via the clutch;
    the motor is connected to the second rotating element;
    the third rotating element is an output element; and
    another motor is connected to the third rotating element.

* * * * *